(12) United States Patent
Kim et al.

(10) Patent No.: US 10,184,613 B2
(45) Date of Patent: Jan. 22, 2019

(54) SYSTEM FOR FILLING LPG VEHICLE WITH LPG USING AUXILIARY BOMBE

(71) Applicant: Hyundai Motor Company, Seoul (KR)

(72) Inventors: Chang Han Kim, Gwangju (KR); Jae Hwa Park, Suwon-si (KR); Jong Ki Kim, Seongnam-si (KR); Jae Min Lee, Gongju-si (KR); Keun Soo Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/366,937

(22) Filed: Dec. 1, 2016

(65) Prior Publication Data

US 2018/0031180 A1   Feb. 1, 2018

(30) Foreign Application Priority Data

Jul. 27, 2016   (KR) .................. 10-2016-0095133

(51) Int. Cl.
  *F02M 21/02* (2006.01)
  *F17C 11/00* (2006.01)
  (Continued)

(52) U.S. Cl.
  CPC .............. *F17C 5/02* (2013.01); *B67D 7/3272* (2013.01); *B67D 7/58* (2013.01);
  (Continued)

(58) Field of Classification Search
  CPC ........... F02M 21/0221; F02M 21/0224; F02M 21/0218; F02M 21/0212; F02M 21/023;
  (Continued)

(56) References Cited

U.S. PATENT DOCUMENTS

| 5,518,272 A * | 5/1996 | Fukagawa ............... B60K 15/07 |
| | | 180/69.5 |
| 2005/0087236 A1* | 4/2005 | Woo ....................... B60K 15/03 |
| | | 137/572 |

(Continued)

FOREIGN PATENT DOCUMENTS

| JP | 7-195948 A | 8/1995 |
| JP | 2011-247368 A | 12/2011 |

(Continued)

*Primary Examiner* — Lindsay Low
*Assistant Examiner* — George Jin
(74) *Attorney, Agent, or Firm* — Morgan, Lewis & Bockius LLP

(57) ABSTRACT

A system for filling an LPG vehicle with LPG using an auxiliary bombe is provided. The system may be configured for easily filling a main bombe with LPG even in the hot season (summertime) or the like during which the outside temperature rapidly rises, by using an auxiliary bombe in addition to using the main bombe. The system may also be capable of always smoothly refilling the main bombe with LPG by moving a portion of the LPG in the main bombe to the auxiliary bombe, when the pressure in the main bombe is higher than the LPG filling pressure of a filling gun in the hot season during which the outside temperature rapidly rises, so that the pressure in the main bombe becomes lower than the filling pressure.

4 Claims, 7 Drawing Sheets

(51) Int. Cl.
*F17C 5/02* (2006.01)
*B67D 7/32* (2010.01)
*B67D 7/58* (2010.01)
*F17C 13/02* (2006.01)
*F17C 13/04* (2006.01)

(52) U.S. Cl.
CPC .... *F02M 21/0218* (2013.01); *F02M 21/0224* (2013.01); *F17C 11/007* (2013.01); *F17C 13/025* (2013.01); *F17C 13/04* (2013.01); F17C 2221/033 (2013.01); F17C 2227/0135 (2013.01); F17C 2250/01 (2013.01); F17C 2250/0434 (2013.01); F17C 2270/0581 (2013.01)

(58) Field of Classification Search
CPC ........... F02M 21/0239; F02M 21/0236; F02M 21/0245; F02M 21/029; F17C 5/02; F17C 5/007; F17C 5/002; F17C 5/04; F17C 11/007; F17C 13/084; F17C 13/083; F17C 13/081; F17C 13/082; F17C 13/12; F17C 2205/013; F17C 2205/0134; F17C 2205/0153; F17C 2221/033; F17C 2221/035; F17C 2270/0165; F17C 2270/0168; F17C 2270/0171; F17C 2270/0178; F17C 2270/0184; B60K 2015/03013; B60K 2015/03118; B60K 2015/03138; B60K 2015/03144; B60K 2015/03171; B60K 15/07; B60K 15/067; B60K 15/073

See application file for complete search history.

(56) References Cited

U.S. PATENT DOCUMENTS

| | | | |
|---|---|---|---|
| 2006/0033322 A1* | 2/2006 | Suess | B60K 15/03006 280/830 |
| 2006/0042606 A1* | 3/2006 | Van Dyke | B60K 15/03006 123/527 |
| 2011/0226362 A1* | 9/2011 | Oxley | B60K 15/03006 137/572 |
| 2012/0060935 A1* | 3/2012 | Carter | F02M 21/0212 137/14 |
| 2012/0161430 A1 | 6/2012 | Mulanon | |

FOREIGN PATENT DOCUMENTS

| KR | 20-1997-009730 Y1 | 3/1997 |
|---|---|---|
| KR | 10-0449855 B1 | 9/2004 |
| KR | 10-0722232 B1 | 5/2007 |
| KR | 10-0861547 B1 | 10/2008 |
| KR | 10-2012-0084873 A | 7/2012 |
| KR | 10-2013-0065025 A | 6/2013 |
| KR | 10-2013-0065026 A | 6/2013 |
| KR | 10-2013-0066008 A | 6/2013 |

* cited by examiner

SYSTEM FOR FILLING LPG VEHICLE WITH LPG USING AUXILIARY BOMBE

CROSS-REFERENCE TO RELATED APPLICATION

The present application claims priority to Korean Patent Application No. 10-2016-0095133 filed on Jul. 27, 2016, the entire contents of which is incorporated herein for all purposes by this reference.

BACKGROUND

Field of the Invention

The present invention relates to a system for filling a liquefied petroleum gas (LPG) vehicle with LPG using an auxiliary bombe. More particularly, it relates to a system for filling an LPG vehicle with LPG using an auxiliary bombe, which is configured for filling a main bombe with LPG even in the hot season (summertime) or the like during which the outside temperature rapidly rises, by using an auxiliary bombe in addition to using the main bombe.

Description of Related Art

As illustrated in FIG. 7, a process of filling an LPG vehicle generally includes a step of operating a filling pump 2 of a gas station, a step of sending LPG to a filling gun 3 from an LPG reservoir 1 of the gas station by the operation of the filling pump 2, and a step of filling an LPG bombe of the vehicle with LPG by the LPG filling pressure of the filling gun 3.

However, the filling of LPG may be impossible when the pressure in the LPG bombe of the vehicle is higher than an LPG filling pressure in the hot season during which the outside temperature rapidly rises.

That is, when the pressure in the LPG bombe of the vehicle is higher than the LPG filling pressure, a check valve integrated with an excess flow valve is not opened. For this reason, it is impossible to fill the LPG bombe with LPG from the filling gun.

For example, the pressure (e.g. 16.5 bar) in the LPG bombe of the vehicle becomes higher than the LPG filling pressure (16.3 bar=8.3 bar, which is the pressure in the LPG reservoir of the gas station, +8.0 bar, which is the LPG pumping pressure resulting from the operation of the filling pump) of the filling gun in the hot season in which the atmospheric temperature is equal to or higher than about 40° C., thereby preventing the opening of the check valve integrated with the excess flow valve. For this reason, it is impossible to fill the LPG bombe with LPG from the filling gun.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for filling an LPG vehicle with LPG using an auxiliary bombe, which is configured for continuously smoothly refilling a main bombe with LPG, by installing an auxiliary bombe in a vehicle in addition to the main bombe, and by moving a portion of the LPG in the main bombe to the auxiliary bombe, when the pressure in the main bombe is higher than the LPG filling pressure of a filling gun in the hot season during which an outside temperature rapidly rises, so that the pressure in the main bombe becomes lower than the filling pressure.

In an exemplary embodiment, a system for filling an LPG vehicle with LPG using an auxiliary bombe includes main and auxiliary bombes mounted in an LPG vehicle, a fuel transfer line connected between the main bombe and auxiliary bombe, a first solenoid valve mounted on the fuel transfer line so as be openable and closable, an internal pressure rising means mounted in the auxiliary bombe to increase an temperature and a pressure in the auxiliary bombe, and a controller that controls opening and closing of the first solenoid valve.

The system may further include a first pressure sensor for detecting a pressure in the main bombe, and a second pressure sensor for detecting the pressure in the auxiliary bombe.

The internal pressure rising means may be an auxiliary fuel pump mounted in the auxiliary bombe to press LPG.

The internal pressure rising means may be a heater mounted in the auxiliary bombe to increase the temperature in the auxiliary bombe.

When a pressure in the main bombe is higher than a reference filling pressure, or when the pressure in the auxiliary bombe, rising along with operation of the internal pressure rising means, is higher than the pressure in the main bombe, the first solenoid valve may be opened by the controller.

The main bombe may be mounted on an underbody located at a rear bottom of a vehicle body, and the auxiliary bombe may be mounted on a luggage room floor panel in a vehicle interior.

In another exemplary embodiment, a system for filling an LPG vehicle with LPG using an auxiliary bombe includes main and auxiliary bombes mounted in an LPG vehicle, a fuel transfer line connected between the main bombe and auxiliary bombe, a first solenoid valve mounted on the fuel transfer line so as be openable and closable, an auxiliary fuel pump mounted in the auxiliary bombe, a second solenoid valve mounted to a discharge side of the auxiliary fuel pump, the second solenoid valve being opened when LPG is directly supplied to an engine, and a controller that controls opening and closing of the first and second solenoid valves.

The system may further include a first pressure sensor for detecting a pressure in the main bombe, and a second pressure sensor for detecting a pressure in the auxiliary bombe.

When a pressure in the main bombe is higher than a reference filling pressure, the first solenoid valve may be opened by the controller.

An outlet line of the second solenoid valve may be connected to a fuel supply line through which fuel is supplied from the main bombe to the engine.

The second solenoid valve may be opened in response to a control signal of the controller when the engine is driven at a low load.

The second solenoid valve may be opened in response to a control signal of the controller in the event of an emergency situation where fuel in the main bombe is not pumped to the engine.

The main bombe may be mounted on an underbody located at a rear bottom of a vehicle body, and the auxiliary bombe may be mounted on a luggage room floor panel in a vehicle interior.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
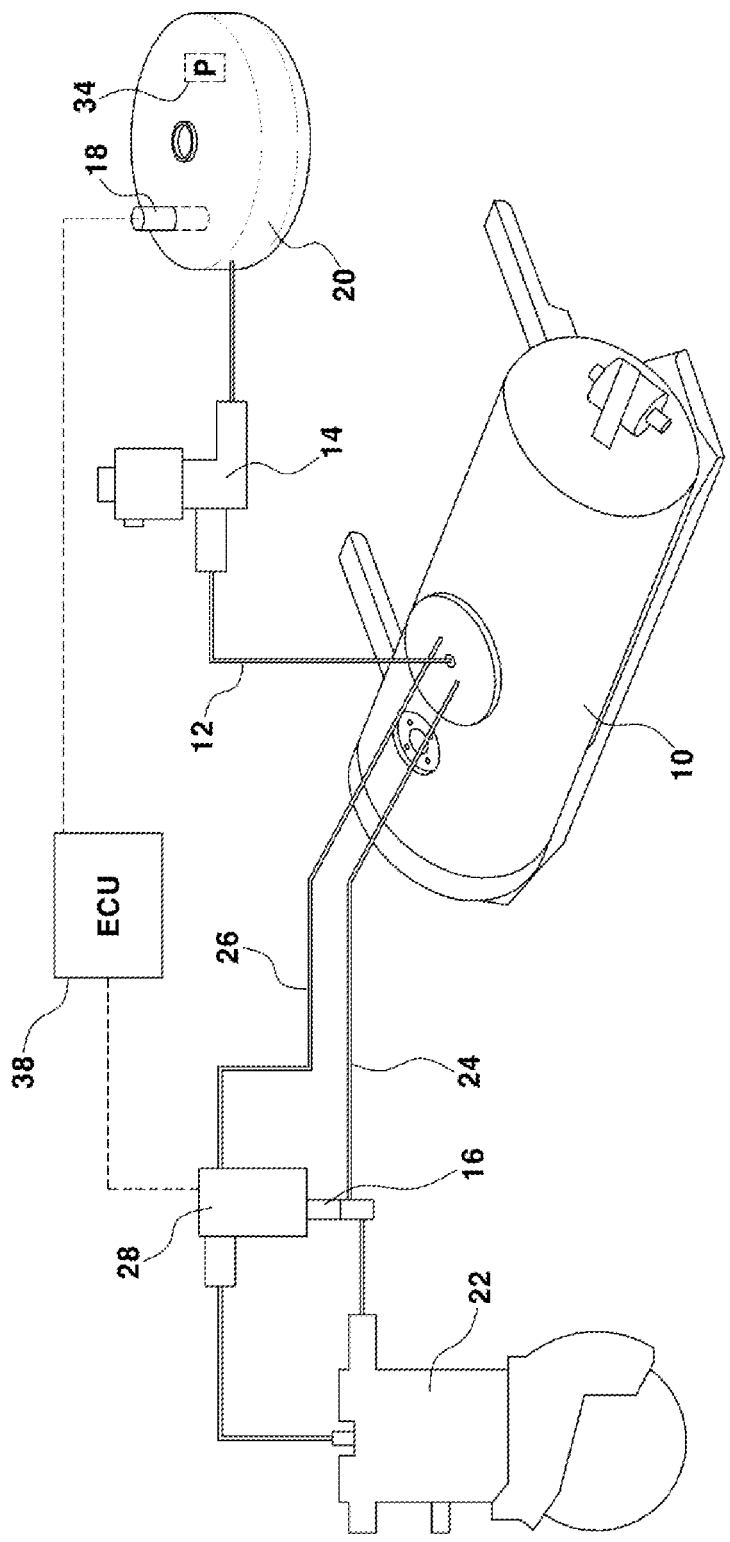
FIG. 1 and FIG. 2 are diagrams illustrating a system for filling an LPG vehicle with LPG using an auxiliary bombe according to various exemplary embodiments of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
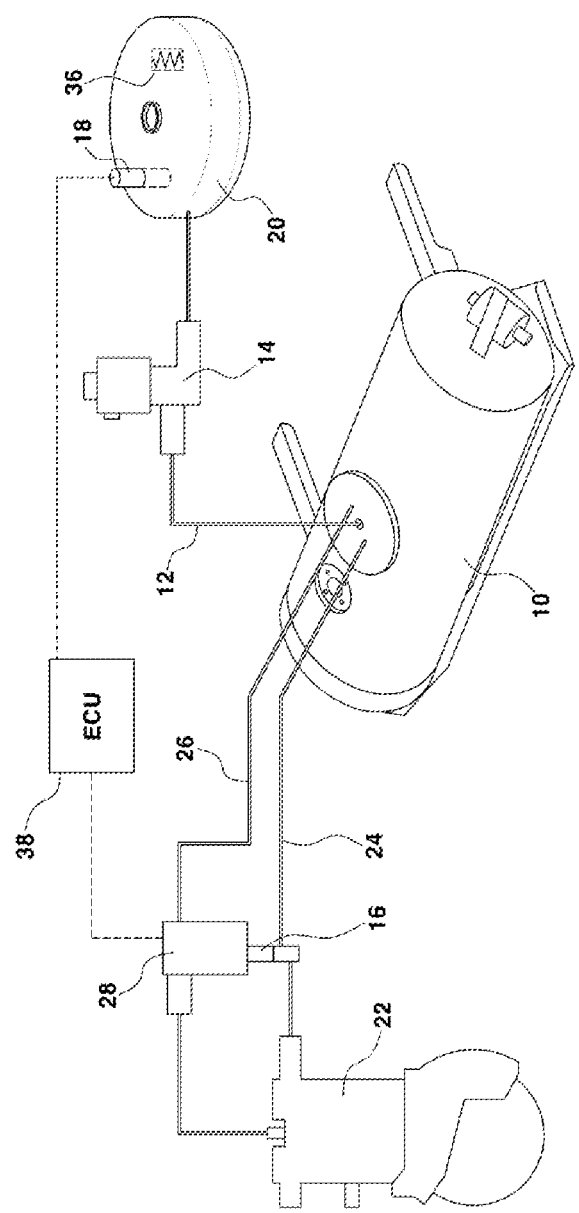

FIG. 1 and FIG. 2 illustrate a system for filling an LPG vehicle with LPG using an auxiliary bombe according to various exemplary embodiments of the present invention.

The systems for filling an LPG vehicle illustrated in FIG. 1 and FIG. 2 have the same configuration, but they differ from each other in that an internal pressure rising means mounted in an auxiliary bombe is illustrated as an auxiliary fuel pump in FIG. 1 whereas it is illustrated as a heater in FIG. 2.

In FIG. 1 and FIG. 2, reference numeral 10 refers to a main bombe which is the main fuel tank of an LPG vehicle.

When the pressure in the main bombe 10 is higher than the filling pressure of an LPG filling gun in the hot season during which an outside temperature rises, it is impossible to fill the main bombe 10 with LPG.

To resolve the phenomenon wherein it is impossible to refill the main bombe 10 with LPG, an auxiliary bombe 20 is further mounted in the vehicle together with the main bombe 10 in an exemplary embodiment of the present invention.

Figure 6:
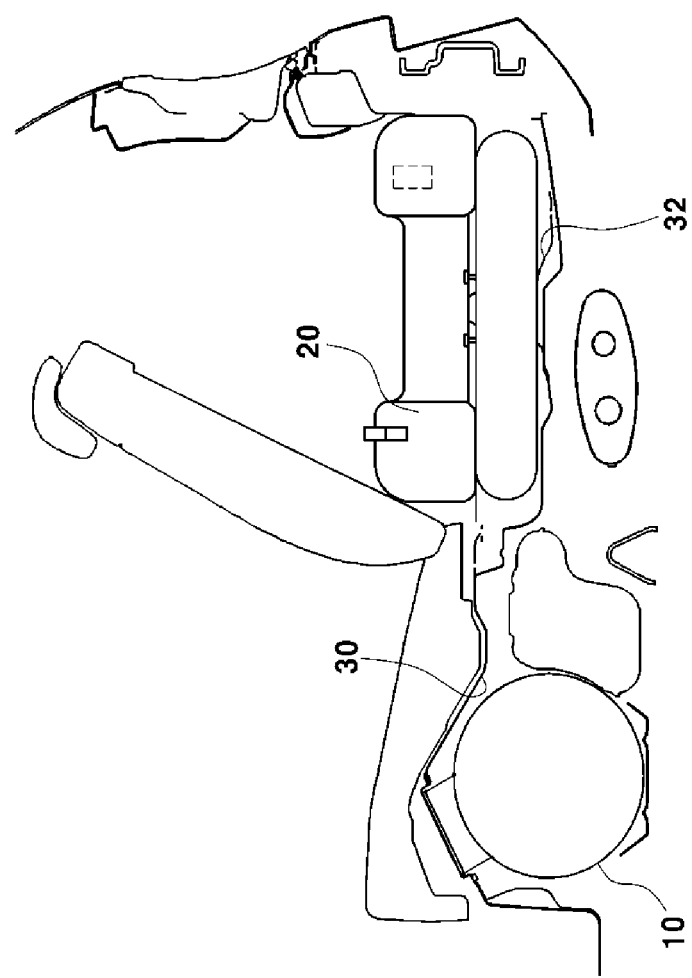
FIG. 6 is a view schematically illustrating positions at which a main bombe and an auxiliary bombe used in an exemplary embodiment of the present invention are mounted.
Figure 7:
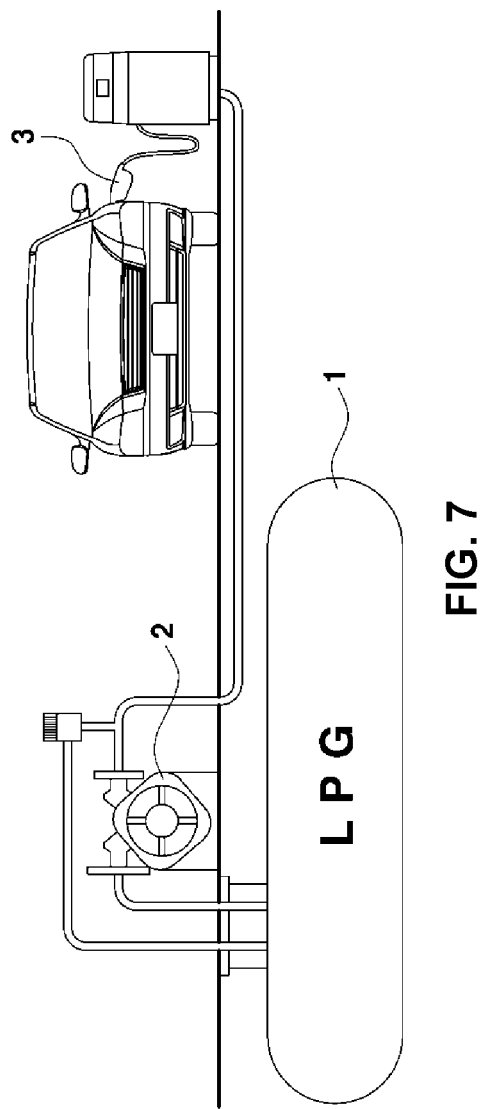
FIG. 7 is a view schematically illustrating a process of filling an LPG vehicle.

As illustrated in FIG. 6, the main bombe 10 is mounted on an underbody 30 which is located at the rear bottom of the vehicle body and is an advantageous place for increasing the capacity of the bombe, and the auxiliary bombe 20 is mounted on a luggage room floor panel 32 in which variation in temperature in the bombe is small.

Here, the main bombe 10 is connected to the auxiliary bombe 20 such that they fluidically-communicate with each other through a fuel transfer line 12. A first solenoid valve 14 is mounted on the fuel transfer line 12 to block or allow the transfer of fuel.

In the instant case, the pressure in each of the bombes 10 and 20 must be measured to transfer LPG between the main bombe 10 and the auxiliary bombe 20.

To this end, a first pressure sensor 16 for detecting the pressure in the main bombe 10 is mounted in the main bombe 10, and a second pressure sensor 18 for detecting the pressure in the auxiliary bombe 20 is mounted in the auxiliary bombe 20.

The first pressure sensor 16 is preferably included in a regulator 28 which is mounted between a fuel supply line 24 and a fuel return line 26.

For reference, the regulator 28 controls the flow rate and pressure of fuel when the LPG in the main bombe 10 is supplied to an engine 22 through the fuel supply line 24, and when unburned fuel is returned to the main bombe 10 through the fuel return line 26.

When the fuel in the main bombe 10 is supplied to the engine 22 through the fuel supply line 24, the pressure of the fuel passing through the regulator 28 is detected by the first pressure sensor included in the regulator 28, and the detected fuel pressure is transmitted, as the pressure signal in the main bombe 10, to a controller 38.

In addition, since the pressure in the auxiliary bombe 20, which is detected by the second pressure sensor 18, is transmitted as the pressure signal therein to the controller 38, the controller 38 controls the opening and closing of the first solenoid valve 14 based on the signals detected by the first and second pressure sensors 16 and 18.

When the pressure in the main bombe 10 is higher than a reference filling pressure, or when the pressure in the auxiliary bombe 20, which rises along with the operation of the internal pressure rising means, is higher than the pressure in the main bombe 10, the controller 38 causes the first solenoid valve 14 to be opened. In other cases, the controller 38 causes the first solenoid valve 14 to be closed.

Meanwhile, to transfer LPG from the main bombe 10 to the auxiliary bombe 20 and then to retransfer the LPG from the auxiliary bombe 20 to the main bombe 10, the pressure of the fuel of the auxiliary bombe 20 or the pressure therein must be increased.

To this end, the internal pressure rising means is mounted in the auxiliary bombe 20 to increase the temperature and pressure in the auxiliary bombe 20.

The internal pressure rising means may be an auxiliary fuel pump 34 which is mounted in the auxiliary bombe 20 to press the LPG therein, or may be a heater 36 which is mounted in the auxiliary bombe 20 to increase the temperature and pressure in the auxiliary bombe 20.

Figure 3:
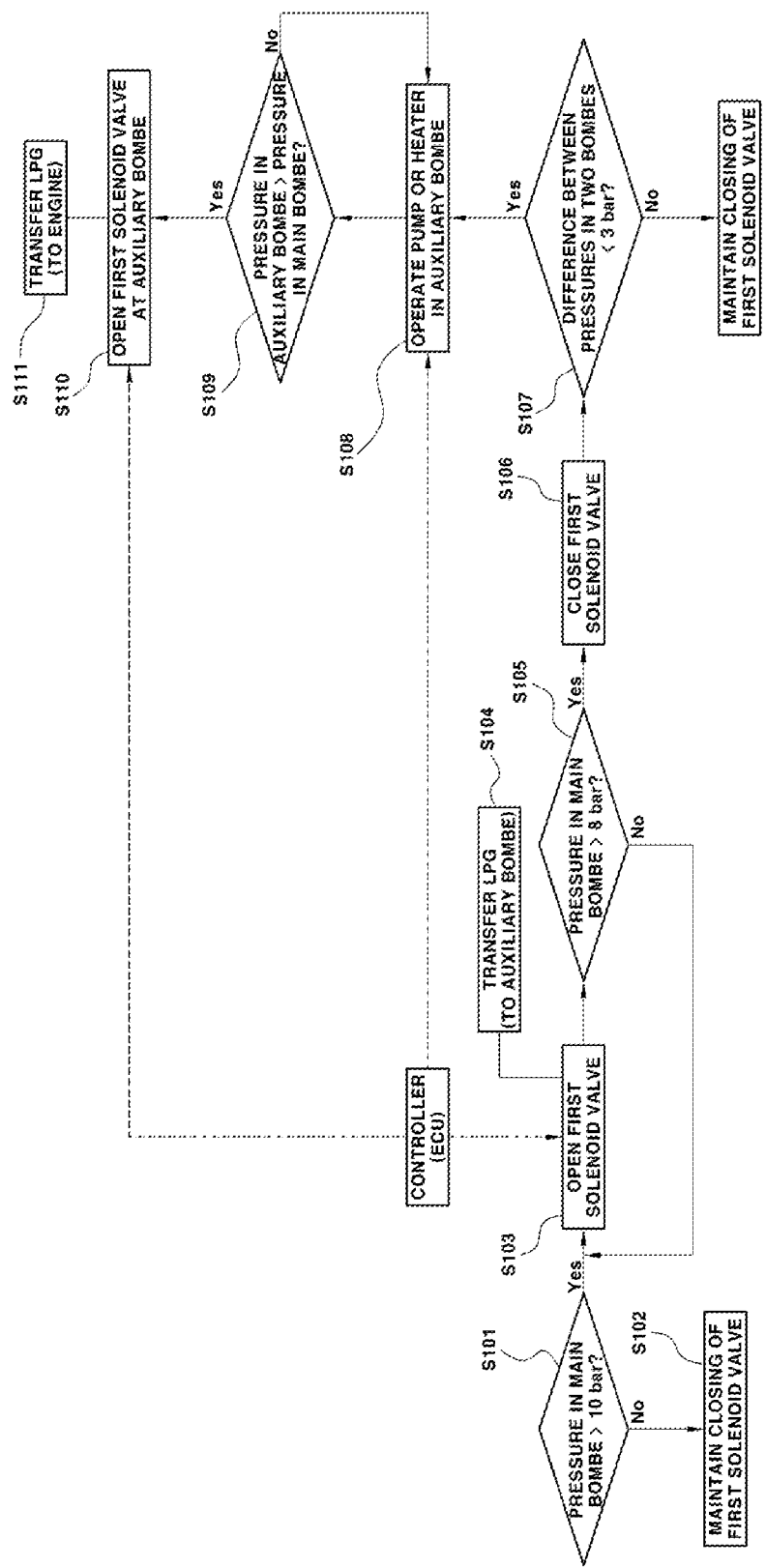
FIG. 3 is a flowchart illustrating the operation of the system for filling an LPG vehicle with LPG using an auxiliary bombe according to the various exemplary embodiments of the present invention.

Hereinafter, the operation of the system for filling an LPG vehicle having the above configuration according to the various exemplary embodiments of the present invention will be described with reference to FIGS. 1 to 3.

First, the pressure in the main bombe 10 is detected.

That is, the first pressure sensor 16 detects the pressure in the main bombe 10, and transmits the detected signal to the controller 38.

The controller 38 compares the pressure in the main bombe 10 with a reference upper limit pressure (e.g. 10 bar) (S101).

When the pressure in the main bombe 10 is lower than the reference upper limit pressure (e.g. 10 bar) as a result of the comparison, the controller 38 causes the first solenoid valve 14 to be closed (S102).

In other words, when the current pressure in the main bombe 10 is lower than the reference upper limit pressure, the controller 38 determines that the pressure in the main bombe 10 is lower than an LPG filling pressure by the filling gun, causing the first solenoid valve 14 to be closed.

Thus, it is possible to easily refill the main bombe 10 with LPG from the filling gun of the gas station while the fuel is not transferred from the main bombe 10 to the auxiliary bombe 20 due to the closing of the first solenoid valve 14.

On the other hand, when the pressure in the main bombe 10 is higher than the reference upper limit pressure (e.g. 10 bar), the controller 38 causes the first solenoid valve 14 to be opened (S103).

In other words, when the current pressure in the main bombe 10 is higher than the reference upper limit pressure, the controller 38 determines that the pressure in the main bombe 10 is higher than an LPG filling pressure by the filling gun, causing the first solenoid valve 14 to be opened.

Thus, a portion of the LPG remaining in the main bombe 10 is transferred to the auxiliary bombe 20 along the fuel transfer line 12 (S104).

In the instant case, since the main bombe 10 is mounted on the underbody 30, which is located at the rear bottom of the vehicle body, in an exposed state, the pressure in the main bombe 10 is increased due to radiant heat or geothermal heat in the hot season or the like. On the other hand, since the auxiliary bombe 20 is mounted on the luggage room floor panel 32 in which variation in temperature in the bombe is small, the temperature and pressure in the auxiliary bombe 20 are maintained in a lower state compared to the main bombe 10.

Thus, a portion of the LPG remaining in the main bombe 10 is smoothly transferred to the auxiliary bombe 20 along the fuel transfer line 12, thereby allowing the pressure in the main bombe 10 to be gradually decreased.

When the pressure in the main bombe 10 is decreased, the pressure in the main bombe 10 is compared with a reference lower limit pressure (e.g. 8 bar) (S105).

When the pressure in the main bombe 10 is lower than the reference lower limit pressure as a result of the comparison, the controller 38 causes the first solenoid valve 14 to be closed (S106).

In other words, when the current pressure in the main bombe 10 is lower than the reference lower limit pressure, the controller 38 determines that the pressure in the main bombe 10 is lower than an LPG filling pressure by the filling gun, causing the first solenoid valve 14 to be closed.

Thus, it is possible to easily refill the main bombe 10 with LPG from the filling gun of the gas station while the fuel is not transferred from the main bombe 10 to the auxiliary bombe 20 due to the closing of the first solenoid valve 14.

Accordingly, the pressure in the main bombe 10 may be regulated to be lower than the filling pressure by transferring the fuel in the main bombe 10 to the auxiliary bombe 20. Consequently, it is possible to easily refill the main bombe 10 with LPG.

Meanwhile, the fuel in the main bombe 10 is supplied to the engine while the vehicle is driven, and thus the fuel in the main bombe 10 is continuously consumed. In this context, it is possible to retransfer the fuel transferred to the auxiliary bombe 20 to the main bombe 10 to replenish the main bombe 10.

Accordingly, to retransfer the fuel transferred to the auxiliary bombe 20 to the main bombe 10, the pressure in the auxiliary bombe 20 must become higher than the pressure in the main bombe 10.

For example, when the difference between the pressures in the main and auxiliary bombes 10 and 20 is lower than a reference pressure difference (e.g. 3 bar) while the vehicle is driven at night, namely, when the value obtained by subtracting the pressure in the main bombe 10 from the pressure in the auxiliary bombe 20 is lower than the reference pressure difference, the pressure in the auxiliary bombe 20 must become higher than the pressure in the main bombe 10 over the reference pressure difference.

Based on the signal indicative of the pressure in the main bombe 10 detected by the first pressure sensor 16 and the signal indicative of the pressure in the auxiliary bombe 20 detected by the second pressure sensor 18, the controller 38 determines the difference between the pressures in the main and auxiliary bombes 10 and 20, and compares the determined result with the reference pressure difference (S107).

When the value obtained by subtracting the pressure in the main bombe 10 from the pressure in the auxiliary bombe 20 is lower than the reference pressure difference as a result of the comparison, the controller 38 operates the internal pressure rising means (S108).

In the instant case, the auxiliary fuel pump 34, which is mounted as the internal pressure rising means in the auxiliary bombe 20, may increase the pressure in the auxiliary bombe 20 by pressing LPG. Alternatively, the heater 36, which is mounted as the internal pressure rising means in the auxiliary bombe 20, may be operated to simultaneously increase the temperature and pressure in the auxiliary bombe 20.

Next, the controller 38 determines the difference between the pressures in the main and auxiliary bombes 10 and 20 again (S109). When the pressure in the auxiliary bombe 20 is determined to be higher than the pressure in the main bombe 10 over the reference pressure difference, the controller 38 causes the first solenoid valve 14 to be opened (S110).

Accordingly, the LPG transferred to the auxiliary bombe 20 is retransferred to the main bombe 10 along the fuel transfer line 12 (S111).

Accordingly, since the LPG transferred to the auxiliary bombe 20 is recirculated to the main bombe 10, it is possible to replenish the main bombe 10 with fuel.

Figure 4:
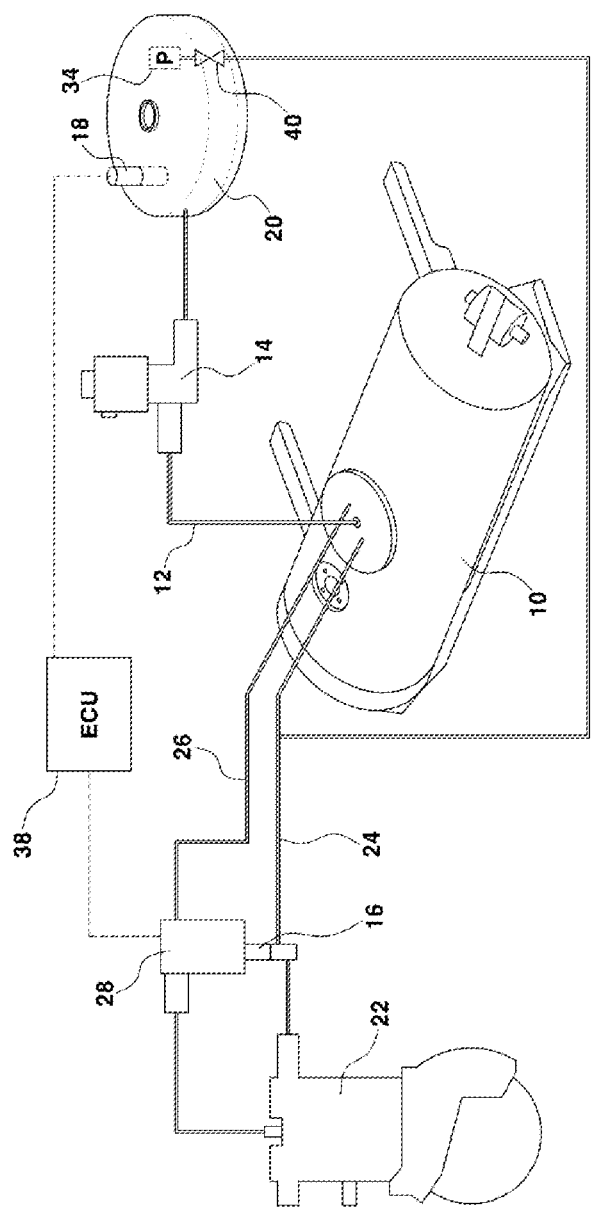
FIG. 4 is a diagram illustrating a system for filling an LPG vehicle with LPG using an auxiliary bombe according to a various exemplary embodiments of the present invention.

FIG. 4 is a diagram illustrating a system for filling an LPG vehicle with LPG using an auxiliary bombe according to various exemplary embodiments of the present invention.

The system for filling an LPG vehicle according to the various exemplary embodiments of the present invention is characterized in that the LPG transferred from a main bombe 10 to an auxiliary bombe 20 may be directly supplied to the engine.

To resolve the phenomenon wherein it is impossible to refill the main bombe 10 with LPG, the auxiliary bombe 20 is further mounted in vehicle together with the main bombe 10 even in the various exemplary embodiments of the present invention.

In addition, the main bombe 10 is connected to the auxiliary bombe 20 such that they fluidically-communicate with each other through a fuel transfer line 12. A first solenoid valve 14 is mounted on the fuel transfer line 12 to block or allow the transfer of fuel. When the pressure in the main bombe 10 is higher than a reference filling pressure, the first solenoid valve 14 is opened by the control of a controller 38.

In addition, a first pressure sensor 16 for detecting the pressure in the main bombe 10 is mounted in the main bombe 10, and a second pressure sensor 18 for detecting the pressure in the auxiliary bombe 20 is mounted in the auxiliary bombe 20.

Similarly, the first pressure sensor 16 may be included in a regulator 28 which is mounted between a fuel supply line 24 and a fuel return line 26.

In the various exemplary embodiments of the present invention, an auxiliary fuel pump 34 is mounted in the auxiliary bombe 20, and a second solenoid valve 40, which is opened when LPG is directly supplied to the engine from the discharge side of the auxiliary fuel pump 34, is mounted in the auxiliary bombe 20.

In the instant case, the outlet line of the second solenoid valve 40 is connected to the fuel supply line 24 through which fuel is supplied from the main bombe 10 to the engine 22.

Accordingly, the second solenoid valve 40 is opened in response to the control signal of the controller 38 when the engine is driven at a low load (i.e., a lower load than a predetermined load amount), so that the LPG in the auxiliary bombe 20 is directly supplied to the engine through the fuel supply line 24.

Alternatively, the second solenoid valve 40 is opened in response to the control signal of the controller 38 in the event of an emergency situation where the fuel in the main bombe 10 is not pumped to the engine, and thus the LPG in the auxiliary bombe 20 may be directly supplied to the engine through the fuel supply line 24.

Figure 5:
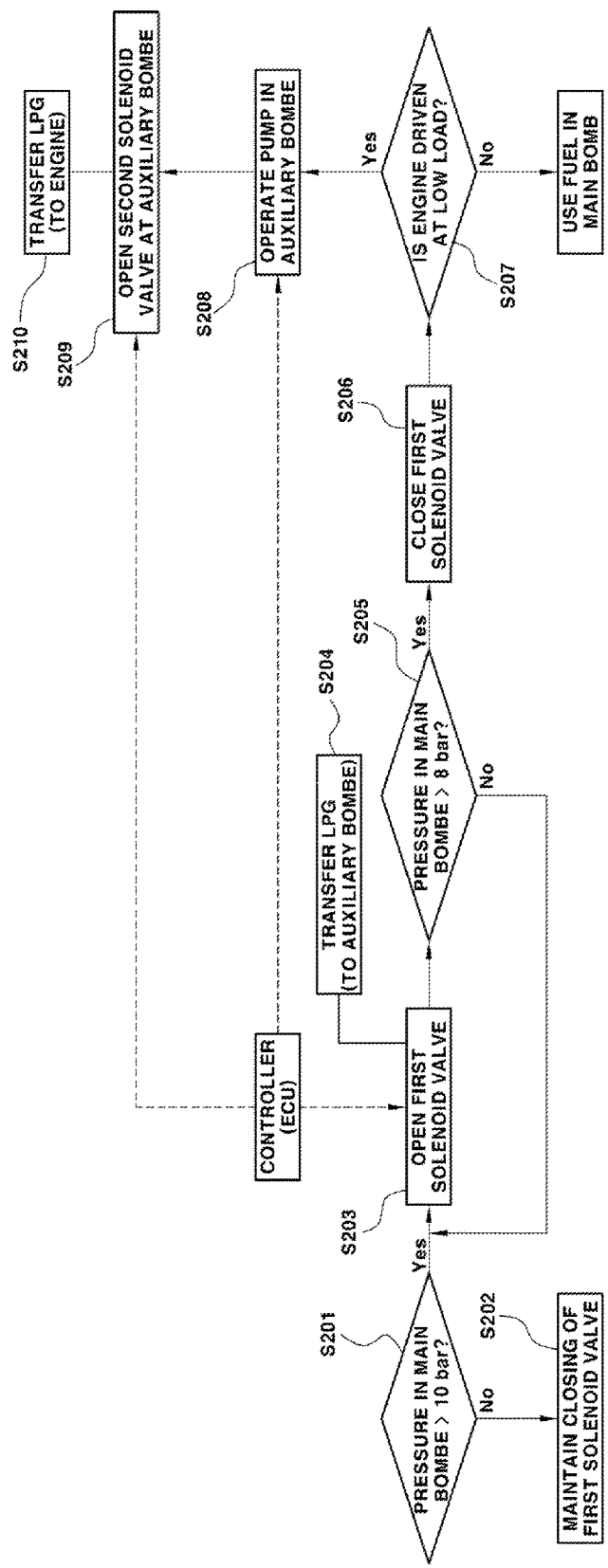
FIG. 5 is a flowchart illustrating the operation of the system for filling an LPG vehicle with LPG using an auxiliary bombe according to the various exemplary embodiments of the present invention.

Hereinafter, the operation of the system for filling an LPG vehicle having the above configuration according to the various exemplary embodiments of the present invention will be described with reference to FIG. 4 and FIG. 5.

First, the pressure in the main bombe 10 is detected.

That is, the first pressure sensor 16 detects the pressure in the main bombe 10, and transmits the detected signal to the controller 38.

The controller 38 compares the pressure in the main bombe 10 with a reference upper limit pressure (e.g. 10 bar) (S201).

When the pressure in the main bombe 10 is lower than the reference upper limit pressure (e.g. 10 bar) as a result of the comparison, the controller 38 causes the first solenoid valve 14 to be closed (S202).

In other words, when the current pressure in the main bombe 10 is lower than the reference upper limit pressure, the controller 38 determines that the pressure in the main bombe 10 is lower than an LPG filling pressure by a filling gun, causing the first solenoid valve 14 to be closed.

Thus, it is possible to easily refill the main bombe 10 with LPG from the filling gun of the gas station while the fuel is not transferred from the main bombe 10 to the auxiliary bombe 20 due to the closing of the first solenoid valve 14.

On the other hand, when the pressure in the main bombe 10 is higher than the reference upper limit pressure (e.g. 10 bar), the controller 38 causes the first solenoid valve 14 to be opened (S203).

In other words, when the current pressure in the main bombe 10 is higher than the reference upper limit pressure, the controller 38 determines that the pressure in the main bombe 10 is higher than an LPG filling pressure by the filling gun, causing the first solenoid valve 14 to be opened.

Thus, a portion of the LPG remaining in the main bombe 10 is transferred to the auxiliary bombe 20 along the fuel transfer line 12 (S204).

In the instant case, since the main bombe 10 is mounted on an underbody 30, which is located at the rear bottom of a vehicle body, in an exposed state, the pressure in the main bombe 10 is increased due to radiant heat or geothermal heat in the hot season or the like. On the other hand, since the auxiliary bombe 20 is mounted on a luggage room floor panel 32 in which variation in temperature in the bombe is small, the temperature and pressure in the auxiliary bombe 20 are maintained in a lower state compared to the main bombe 10.

Thus, a portion of the LPG remaining in the main bombe 10 is smoothly transferred to the auxiliary bombe 20 along the fuel transfer line 12, thereby allowing the pressure in the main bombe 10 to be gradually decreased.

When the pressure in the main bombe 10 is decreased, the pressure in the main bombe 10 is compared with a reference lower limit pressure (e.g. 8 bar) (S205).

When the pressure in the main bombe 10 is lower than the reference lower limit pressure as a result of the comparison, the controller 38 causes the first solenoid valve 14 to be closed (S206).

In other words, when the current pressure in the main bombe 10 is lower than the reference lower limit pressure, the controller 38 determines that the pressure in the main bombe 10 is lower than an LPG filling pressure by the filling gun, thereby causing the first solenoid valve 14 to be closed.

Thus, it is possible to easily refill the main bombe 10 with LPG from the filling gun of the gas station while the fuel is not transferred from the main bombe 10 to the auxiliary bombe 20 due to the closing of the first solenoid valve 14.

In the various exemplary embodiments of the present invention, when the engine is driven at a low load, the fuel transferred from the main bombe 10 to the auxiliary bombe 20 is directly supplied to the engine without being retransferring to the main bombe 10.

To this end, the controller 38 determines that the engine is driven at a low load (S207).

When the engine is determined to be driven at a low load, the controller 38 causes the auxiliary fuel pump 34 mounted in the auxiliary bombe 20 to be operated (S208), and causes the second solenoid valve 40 mounted to the outlet side of the auxiliary bombe 20 to be opened (S209).

Accordingly, since the LPG in the auxiliary bombe 20 is directly supplied to and burned in the engine 22 along the fuel supply line 24, it is possible to consume the fuel transferred from the main bombe 10 to the auxiliary bombe 20 (S210).

Meanwhile, in the event of an emergency situation (e.g., the consumption of the fuel in the main bombe, the failure of the fuel pump in the main bombe, or the like) when LPG is transferred from the main bomb 10 to the auxiliary bombe 20, the controller 38 checks the detection signal of the second pressure sensor 18 mounted in the auxiliary bombe 20.

Next, when the pressure detected by the second pressure sensor is equal to or greater than a predetermined level, the controller 38 determines that LPG is present in the auxiliary bombe 20, causing the second solenoid valve 40 mounted to the outlet side of the auxiliary bombe 20 to be opened.

Accordingly, since the LPG in the auxiliary bombe 20 is directly supplied to and burned in the engine 22 along the fuel supply line 24, the vehicle may be driven in the event of an emergency situation (e.g., the consumption of the fuel in the main bombe, the failure of the fuel pump in the main bombe, or the like).

As is apparent from the above description, the present invention has the following effects.

First, when the pressure in a main bombe becomes higher than the LPG filling pressure of a filling gun in the hot season or the like during which the outside temperature rapidly rises, a portion of the LPG in the main bombe is moved to an auxiliary bombe so that the pressure in the main bombe becomes lower than the filling pressure. Consequently, it is possible to continuously refill the main bombe with LPG.

Secondly, when the pressure in the main bombe is regulated to be lower than the filling pressure, the main bombe can be refilled with fuel by retransferring the fuel, which is transferred to the auxiliary bombe, back to the main bombe.

Thirdly, it is possible to use all of the fuel remaining in the auxiliary bombe by directly supplying the fuel transferred to the auxiliary bombe to an engine when the engine is driven at a low load.

Lastly, since the fuel transferred to the auxiliary bombe is directly supplied to the engine in the event of an emergency situation, such as the consumption of all of the fuel in the main bombe or the failure of a fuel pump in the main bombe, it is possible to cope with an emergency.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for filling a liquefied petroleum gas (LPG) vehicle with LPG using an auxiliary bombe, comprising:
   a main bombe and an auxiliary bombe mounted in the LPG vehicle;
   a fuel transfer line connected between the main bombe and auxiliary bombe;
   a first solenoid valve mounted on the fuel transfer line so as be openable or closable;
   an auxiliary fuel pump mounted in the auxiliary bombe to pressurize LPG fuel while raising internal pressure in the auxiliary bombe to retransfer the LPG fuel that was transferred from the main bombe to the auxiliary bombe back to the main bombe along the fuel transfer line when the first solenoid valve is opened; and
   a controller that is configured to control opening or closing of the first solenoid valve.

2. The system of claim 1, further including a first pressure sensor configured for detecting a pressure in the main bombe, and a second pressure sensor configured for detecting the pressure in the auxiliary bombe.

3. The system of claim 1, wherein when a pressure in the main bombe is higher than a reference filling pressure, or when a pressure in the auxiliary bombe, rising along with operation of the internal pressure rising device, is higher than the pressure in the main bombe, the first solenoid valve is configured to be opened by the controller.

4. The system of claim 1, wherein the main bombe is mounted on an underbody located at a rear bottom of a vehicle body, and the auxiliary bombe is mounted on a luggage room floor panel in a vehicle interior.

* * * * *